Dec. 4, 1951 D. G. C. HARE 2,577,520

RADIO FREQUENCY TRANSPONDER

Filed July 9, 1945 2 SHEETS—SHEET 1

INVENTOR.
DONALD G.C. HARE
BY
William D. Hall
ATTORNEY

Dec. 4, 1951 D. G. C. HARE 2,577,520

RADIO FREQUENCY TRANSPONDER

Filed July 9, 1945 2 SHEETS—SHEET 2

INVENTOR.
DONALD G.C. HARE
BY William D. Hall,
ATTORNEY

Patented Dec. 4, 1951 2,577,520

UNITED STATES PATENT OFFICE 2,577,520

RADIO-FREQUENCY TRANSPONDER

Donald G. C. Hare, Greenvale, N. Y., assignor to the United States of America as represented by the Secretary of War Application July 9, 1945, Serial No. 604,061

1 Claim. (Cl. 250—15)

This invention relates to radio-communication systems and more particularly to a system for transmitting signals in response to energy transmissions received from other radio systems.

It is desirable in certain instances to transmit a signal of a predetermined character in response to a received signal of a predetermined frequency. In some applications it is contemplated that the return signal will be modulated with a single frequency within the audio band. Transmission of such a signal may be accomplished by tuning a single transmitter to the received signal and modulating the transmitter with the desired signal frequency. This method, however, is useful only where very few incoming signals are received. If more than two or three incoming signals are received, the amount of equipment and number of operators required to adjust the equipment becomes prohibitive.

It is an object of the present invention, therefore, to provide a simple, novel circuit for automatically transmitting predetermined signals in response to a plurality of received signals.

In accordance with the present invention there is provided a receiver means for applying signals to a plurality of frequency selector means. The outputs of said frequency selector means are applied to a controlled transmitter.

For a better understanding of the invention, together with other and further objects thereof, reference is had to the following description taken in connection with the accompanying drawings, in which.

Figure 1:
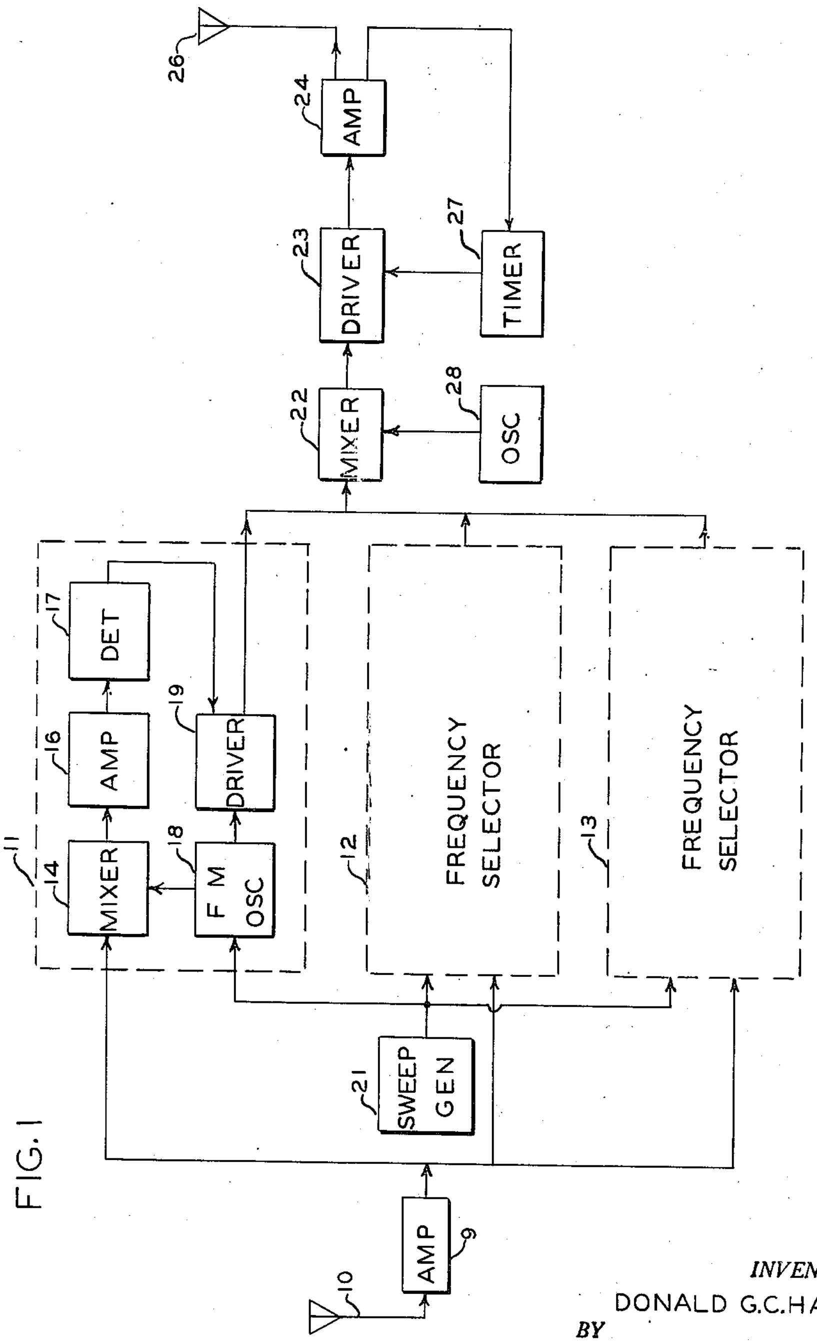
Fig. 1 is a block diagram of the invention.

Referring more particularly to Fig. 1, there is shown a broad band amplifier 9 connected to a receiving antenna 10. The output of amplifier 9 is supplied to three frequency selector units 11, 12 and 13 by suitable connections thereto. As shown in Fig. 1, selector 11 comprises a mixer 14, an amplifier 16 and detector 17 connected in series. A frequency-modulated oscillator 18 supplies signals to mixer 14 and to an over-biased driver 19. Driver 19 also receives a signal from detector 17. The circuits of frequency selector units 12 and 13 are substantially similar to the circuit of unit 11.

A sawtooth sweep generator 21 supplies a signal to units 11, 12, and 13 while the outputs of said units 11, 12, and 13 are connected to a mixer 22 in a controlled transmitter circuit. Mixer 22 supplies a signal to a driver 23 which in turn supplies a signal to amplifier 24. The output of amplifier 24 is connected to transmitting antenna 26. A timer 27 receives a signal from amplifier 24 and supplies a signal to driver 23, while oscillator 28 supplies a signal to mixer 22.

Figure 2:
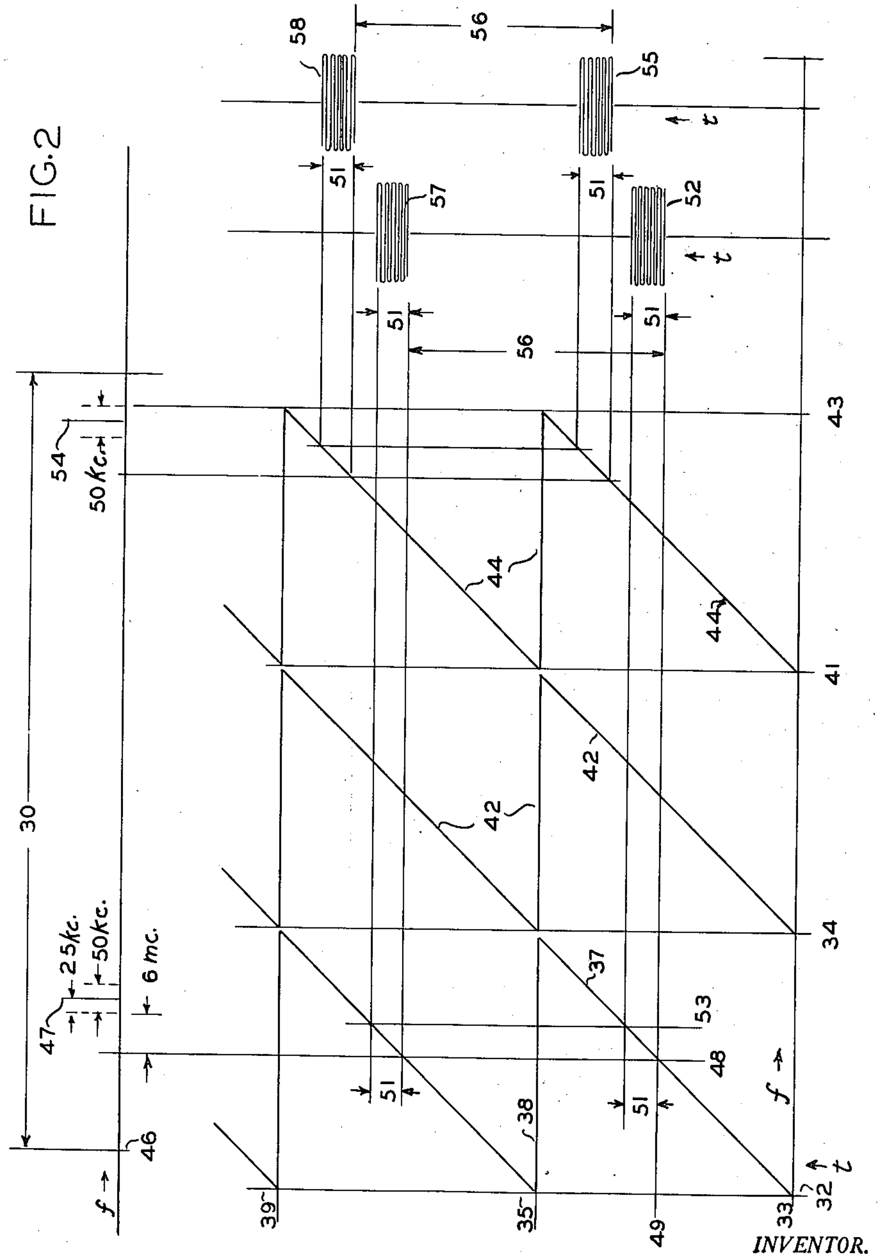
Fig. 2 is a graphical representation of the time and frequency relationships that may exist in the circuit of Fig. 1.

The operation of the circuit of Fig. 1 may best be understood by reference to both Figs. 1 and 2. It is assumed that receiver 9 of Fig. 1 has a band width as indicated by the frequency band 30 of Fig. 2. Oscillator 18 of Fig. 1 produces a signal that is caused to sweep from a frequency 32 at time 33 to a frequency 34 at time 35 under the control of sawtooth generator 21. The time versus frequency relationship of oscillator 18 is shown by line segment 37 of Fig. 2. At time 35 the frequency of oscillator 18 is made to return rapidly to frequency 32 as illustrated by line segment 38. The frequency of oscillator 18 again starts rising until it again reaches frequency 34 at a time 39. This cycle repeats continuously as long as the circuit of Fig. 1 is in operation. A second oscillator (not shown in Fig. 1) in frequency selector 12 sweeps through a band of frequencies 34 to 41 as illustrated by line segments numbered 42. Likewise, a third oscillator (not shown in Fig. 1) in frequency selector 13 sweeps through a band of frequencies between frequency 41 and frequency 43 as illustrated by line segments 44. In actual operation the frequencies of the oscillators that are embodied in the frequency selector units 11, 12, and 13 will overlap slightly in the region of frequencies 34 and 41 to eliminate the possibility of gaps in the band covered by the system. Sweep generator 21 synchronizes the frequency sweep of all of the frequency selectors, thus enabling the entire band to be swept simultaneously.

In this embodiment of the invention, it will be assumed that frequency 32 is at some predetermined frequency, say 6 megacycles below frequency 46, the lowest frequency passed by receiver 9. The reason for setting frequency 32 at this value will become apparent from the description of the remainder of the circuit of Fig. 1. Assume further that amplifier 16 is tuned to a frequency of 6 megacycles and has a pass band of 50 kilocycles. If amplifier 9 is supplying mixer 14 with a signal of frequency 47, amplifier 16 will have an output signal when the frequency of oscillator 18 reaches a frequency 48, where frequency 48 is equal to frequency 47 minus 25 kilocycles minus 6 megacycles. It is assumed that oscillator 18 reaches frequency 48 at time 49. The output of amplifier 16 is detected by detector 17 and applied to driver 19 as a direct-current potential. Very soon after time 49 the output of detector 17 is sufficient to overcome the bias that was causing driver 19 to be inoperative. Driver 19 will now amplify the signal received from oscillator 18. The output of driver 19 is applied to mixer 22 along with a 6 megacycle signal from oscillator 28. The signal that is applied to driver 23 is frequency 47 minus 25 kilocycles. This signal is amplified by driver 23 and amplifier 24 and is transmitted from antenna 26 in response to the signal which is received at antenna 10. When a signal appears in the output of amplifier 24, a portion of this signal is applied to timer 27 to cause timer 27 to become inoperative.

After a predetermined time interval 51 timer 27 causes driver 23 to become inoperative. Time interval 51 is so selected that the frequency of oscillator 18 sweeps from frequency 48 to a frequency 53 where frequency 53 is equal to frequency 47 plus 25 kilocycles minus 6 megacycles. The frequency of the pulse transmitted from antenna 26 (shown as pulse 52 in Fig. 2) varies from frequency 47 minus 25 kilocycles to frequency 47 plus 25 kilocycles. It is assumed that this range of frequencies is within the pass band of any receiver intended to receive this transmission. Timer 27 holds driver 23 inoperative for only a very short period so that the system is conditioned to respond to a signal at another frequency.

If a second signal is received by amplifier 9 at a frequency 54, frequency selector 13 will furnish a signal to mixer 22, and a pulse 55 will be radiated from antenna 26. The frequency of transmission during pulse 55 will vary from frequency 54 minus 25 kilocycles to frequency 54 plus 25 kilocycles. Pulse 55 will have a time duration equal to time interval 51.

After a time interval 56, the frequency of oscillator 18 will again reach frequency 48 so a pulse 57 will be transmitted by antenna 26 that corresponds in time duration and frequency to pulse 52, provided a signal is being received at that frequency. In a similar manner a pulse 58 will be transmitted from antenna 26 at a time interval 56 after pulse 54 in response to a received signal. Pulse 57 will correspond in frequency and time duration to pulse 52. The time interval 56 between pulses is determined by the sweep rate of sawtooth generator 21. The system will respond in a similar manner to signals received at other frequencies within the operative range.

It can be seen that a receiver tuned to frequency 47, and which is intended to receive the transmission, will receive only pulses as 52 and 57. Such a receiver may detect the energy in pulses 52 and 57 and present the information in the form of rectangular pulses having substantially the same shape as the envelope of the waveform of pulses 52 and 57. If, however, said receiver is designed to give an output at only one modulation frequency, say 1000 cycles, this signal may be made to appear in the output of the receiver by making time interval 56 equal to one period of the 1000-cycle wave.

In a similar manner a receiver tuned to frequency 54 would receive pulses as 55 and 58 and reproduce them as rectangular pulses if the receiver is designed for a video response, or as a sine wave having a period equal to time interval 56 if the receiver has a selective response.

It can be seen that many received signals may be handled by each frequency selector since any particular signal operates the selector for a relatively short period of time. The number of frequency selectors used with one receiver will depend on the band to be covered and the design of amplifier 9.

It should be understood that the specific frequencies mentioned in the description of Fig. 1 should not be considered as limiting the invention to these frequencies, nor should they necessarily be considered as typical values for this circuit, as the frequencies mentioned serve only to facilitate the explanation of the circuit of Fig. 1.

While there has been described what is at present considered the preferred embodiment of the invention, it will be obvious to those skilled in the art that various changes and modifications may be made therein without departing from the invention.

What is claimed is:

A responding radio system, comprising a signal receiver having a given frequency band pass; a plurality of frequency selectors for corresponding respective successively adjacent portions of said band pass, said respective corresponding portions and the overall range covered by said selectors being shifted with respect to said receiver band pass by a given frequency differential; a periodic sweep voltage generator connected to said selectors for effecting a scanning thereby of said respective corresponding band pass portions; a signal transmitter, and means forming a supplying circuit for said transmitter connected thereto and to said selectors; each of said selectors including a first mixer circuit connected to said receiver, a frequency modulated oscillator connected to be controlled by said sweep voltage generator and connected to supply said mixer, a translating circuit for the output of said mixer responsive only to said frequency differential, a normally inoperative output circuit for said frequency modulated oscillator, and a circuit connected to detect the output of said translating circuit and to render said output circuit operative in response to a selected signal; said transmitter supplying circuit including a second mixer circuit connected to receive the output of said respective output circuits, a second oscillator having an output frequency equal to said frequency differential and connected to feed said second mixer, circuit means for coupling the output of said second mixer to said transmitter, means for controlling the operability of said coupling means with respect to time, and means for feeding back a portion of any signal in said transmitter to said controlling means, whereby the operability of said coupling means is effected in response to a selected signal.

DONALD G. C. HARE.

REFERENCES CITED

The following references are of record in the file of this patent:

UNITED STATES PATENTS

| Number | Name | Date |
|---|---|---|
| Re. 21,955 | Chaffee | Nov. 25, 1941 |
| 2,317,547 | McRae | Apr. 27, 1943 |
| 2,363,583 | Gilman | Nov. 28, 1944 |
| 2,369,268 | Trevor | Feb. 13, 1945 |
| 2,378,604 | Wallace | June 19, 1945 |
| 2,400,309 | Kock | May 14, 1946 |
| 2,412,991 | Labin | Dec. 24, 1946 |
| 2,433,782 | Murdoch | Dec. 30, 1947 |
| 2,433,804 | Wolff | Dec. 30, 1947 |

FOREIGN PATENTS

| Number | Country | Date |
|---|---|---|
| 551,472 | Great Britain | Feb. 24, 1943 |